United States Patent [19]

Burgess et al.

[11] B 3,915,944

[45] Oct. 28, 1975

[54] PREVENTION OF POLYMER BUILD UP IN REACTORS USED FOR VINYL CHLORIDE POLYMERIZATION

[75] Inventors: Robin Henry Burgess, Hertford; Richard William Tomlinson, Manchester, both of England

[73] Assignee: Imperial Chemical Industries Limited, London, England

[22] Filed: Nov. 12, 1973

[21] Appl. No.: 415,124

[44] Published under the Trial Voluntary Protest Program on January 28, 1975 as document no. B 415,124.

[30] Foreign Application Priority Data
Nov. 20, 1972   United Kingdom............... 53489/72

[52] U.S. Cl. .................... 260/92.8 W; 260/87.5 R
[51] Int. Cl.² ........................................... C08F 2/20
[58] Field of Search ................. 260/92.8 W, 87.5 R

[56] References Cited
UNITED STATES PATENTS
3,515,709   6/1970   Nelson et al. ..................... 260/92.8

Primary Examiner—Stanford M. Levin
Attorney, Agent, or Firm—Cushman, Darby & Cushman

[57]   ABSTRACT

Vinyl chloride is polymerised in aqueous dispersion, preferably in aqueous suspension, in the presence of a polymeric imine such as polyethylene imine, the pH of the reaction medium being maintained at or above 4 by a buffering mixture or an alkaline substance. The process enables the production of vinyl chloride polymers with a minimum of polymer build-up on the walls of the polymerisation reactor.

12 Claims, No Drawings

PREVENTION OF POLYMER BUILD UP IN REACTORS USED FOR VINYL CHLORIDE POLYMERIZATION

The present invention relates to the production of vinyl chloride polymers by an aqueous dispersion polymerisation process.

It is well known to produce vinyl chloride polymers using an aqueous dispersion polymerisation process, e.g., by polymerising vinyl chloride or vinyl chloride and an ethylenically unsaturated monomer copolymerisable therewith, in aqueous suspension in a reactor (conveniently made of a metal such as stainless steel) using a protective colloid as a suspension agent and a free-radical-yielding substance (usually monomer soluble) as initiator. While this type of process has now been commercially developed to a high degree of sophistication, one important drawback that has remained obstinately outstanding is the formation of a layer of build-up upon the inner surface of the polymerisation reactor. This build-up necessitates inter-batch cleaning, by which we mean that the deposited build-up is removed as completely as possible (e.g., by scraping, solvent cleaning or pressure-washing) from the inner wall of the reactor after completing each polymerisation in a given reactor. If this were not done, then parts of the hard polymeric material constituting the build-up could find their way into the particles made in subsequent batches in the same reactor and deleteriously affect the properties of the resulting polymers. Even more seriously, the formation of build-up reduces the heat transfer ability of the reactor wall to the cooling fluid (usually water) circulating in a jacket surrounding the reactor (many polymerisation reactors are cooled by this type of arrangement) which necessitates an increased cooling requirement to maintain the desired polymerisation temperature. It is clearly seen that this situation could rapidly worsen with successive batches made in a given reactor if the inner surface of the reactor was not cleaned after the completion of each polymerisation batch, and adequate temperature control could quickly become impossible. In fact, adequate temperature control could become questionable or even impossible in the very next polymerisation carried out in a reactor (particularly a very large reactor) which, for the first time, has not had its build-up removed.

This seemingly invariable formation of a skin of build-up which increases with polymerisation time is also a major difficulty in the development of trouble-free continuous processes for the aqueous dispersion polymerisation of vinyl chloride.

We have now discovered a process whereby vinyl chloride polymers may be prepared in aqueous dispersion without or with a much reduced formation of build-up. This process may substantially reduce the cleaning effort required between each batch polymerisation and may even allow two or more successive batch polymerisations to be carried out in the same reactor without the necessity for inter-batch removal of build-up. The avoidance of the necessity for interbatch cleaning in batch polymerisations is of great economic significance since it not only avoids the expense of the equipment and manpower required to carry out such cleaning but also shortens the turn-round time of a given reactor leading to increased productivity.

In addition, the process of our invention could be applied with advantage to the continuous polymerisation of vinyl chloride since it overcomes the drawback of an ever-thickening layer of build-up.

According to the present invention we provide a process for the production of vinyl chloride polymers which comprises polymerising under conditions of vigorous agitation vinyl chloride, or vinyl chloride and up to 20 percent by weight thereof of at least one ethylenically unsaturated monomer copolymerisable therewith, in aqueous dispersion, preferably in aqueous suspension, in the presence of a polymeric imine derived from an aziridine, the pH of the polymerisation medium being maintained at at least 4 for all or for a substantial period, e.g., 70 percent, of the polymerisation reaction.

The aziridine used to produce the polymeric imine is preferably unsubstituted (viz., ethylene imine) but may be substituted with one or more suitable radicals (e.g., alkyl, aryl, aralkyl, alkoxy, amido, ester, or halogen radicals) although it is to be understood that any substitution of the aziridine should be such that (a) a polymeric imine may be formed from the monomer and (b) the resulting polymeric imine when used as defined in our process does not inhibit the vinyl chloride polymerisation to any unacceptable extent.

It is preferred in our process to employ polyethylene imine as the polymeric imine as it is readily available and very effective. The polyethylene imine may be prepared by the polymerisation of ethylene imine in the presence of an acid.

The polymeric imine may be applied as a solution thereof, e.g., by spraying or flushing, onto the reactor wall before adding the ingredients for the polymerisation or by charging the imine to the aqueous medium in the reactor. A combination of both methods may also be used.

In cases where the polymeric imine is added to the aqueous polymerisation charge, particularly when polyethylene imine is used, it is preferable to add from 10 to 200 parts per million, based on the total charge of vinyl chloride, of the polymeric imine. The use of an amount less than 10 parts per million may not always be effective and the use of an amount greater than 200 parts per million may result in retardation of the polymerisation reaction or may result in granulation and/or heat stability problems. Particularly preferably, 20 to 80 parts per million of the polymeric imine should be used. It is, however, to be understood that the preferred lower limit of 10 parts per million and preferred upper limit of 200 parts per million has been arrived at in the light of our experience when using polymerisation autoclaves presently avialable to us and it may well be that amounts outside these limits are more effective in other autoclaves. For example, the use of less than 10 parts per million may well be very effective in extremely large reactors.

The pH of the reaction medium may be maintained at at least 4 by the addition of an alkaline substance thereto, at or before the commencement of polymerisation and/or intermittently or continuously during the polymerisation reaction. Suitable alkaline substances include hydroxides, carbonates or bicarbonates of sodium, calcium or ammonium. Alternatively the pH may be maintained at or above 4 by the use of a suitable buffering system. For example, the pH may be maintained above 5 by the use of a buffering system comprising a mixture of disodium hydrogen ortho phosphate ($Na_2HPO_4$) and mono sodium hydrogen ortho phosphate (NaH$_2$PO$_4$). It is, however, to be understood that it is not always necessary to add an alkaline substance or a buffering system because the pH of the reaction medium may well remain above 4 for all or for most of the reaction of its own accord.

It is believed that the necessity for maintaining the pH above 4 for all or for a substantial part of the polymerisation in our process is to prevent or to lessen the likelihood of the polymeric imine reacting to any extent with any acid present in the polymerisation medium, e.g., hydrochloric acid which is often formed to some extent during vinyl chloride polymerisations. It is thought that such reactions lessen or remove the effectiveness of the polymeric imine. It may in some cases be preferable to maintain the pH above 5, particularly above 6, especially in the early part of the polymerisation.

In the preferred process of our invention vinyl chloride is polymerised in aqueous suspension and in such a process the ingredients conventionally used in vinyl chloride aqueous suspension polymerisations which include suspension agents and freeradical yielding initiators (usually monomer soluble) should be employed.

It is possible in the process of our invention to incorporate any suitable additive (such as a heat stabiliser) into the polymerising reactants (provided it does not unacceptably inhibit the effect of the polymeric imine) at any stage of the polymerisation, although if it is added at or towards the beginning of polymerisation it should not unacceptably inhibit the polymerisation reaction.

The present invention is illustrated by the following examples.

EXAMPLES 1 TO 9

A series of vinyl chloride batch polymerisations was carried out in a stainless steel reactor to assess the effect of the concentration of polyethylene imine on build-up formation and reaction time. The basic recipe used consisted of pretreating the reactor wall with polyethylene imine or adding various quantities of polyethylene imine to the reactor charge as described in Table 1. Polymerisation was carried out in aqueous suspension using 100 parts of vinyl chloride, 210 parts of water, a paddle stirrer rotating at 300.r.p.m., a polymerisation temperature of 50°C, 0.08 parts of diethylperoxydicarbonate as initiator and a suspension agent consisting of 0.2 parts of a partially hydrolysed polyvinyl acetate resin. The polymerisation of each batch was continued until the pressure in the autoclave had fallen by 40 p.s.i. below the steady pressure during polymerisation. The pH of the reaction for all or for most of the polymerisation was not less than 4 in each run. The amount of build-up was estimated visually.

TABLE 1

| Example No | Amount polyethylene imine used (parts per million vinyl chloride charged) | Amount of build-up produced | Total reaction time (minutes) |
| --- | --- | --- | --- |
| 1 | None | Skin on all metal surfaces | 350 |
| 2 | 1000 (c) | None | >720 |
| 3 | 150 (c) | None | >720 |
| 4 | 100 (c) | None | 420 |
| 5 | 50 (c) | None | 350 |
| 6 | 20 (c) | Slight build-up | 350 |
| 7 | 1000 (p) | None | >720 |
| 8 | 200 (s) | None | 340 |
| 9 | 60 (s) | None | 350 |

(c) Added with charge water
(p) Painted on reactor surface (in aqueous solution)
(s) Sprayed on reactor surface (in aqueous solution)

The results shown in Table 1 show that inhibition of build-up may be achieved with the use of polyethylene imine according to our invention although when the imine is used in an amount in excess of 100 parts per million, retardation of the polymerisation reaction may occur.

EXAMPLES 10 TO 17

A series of vinyl chloride batch polymerisations was carried out in a stainless steel reactor to assess the effect of pH on the effectiveness of polyethylene imine as a method of reducing build-up formation. 50 ppm of polyethylene imine were added to all polymerisations (in the charge water) and the pH adjusted by the addition of sodium bicarbonate (NaHCO$_3$), a mixture of disodium hydrogen ortho phosphate (Na$_2$HPO$_4$) and mono sodium hydrogen ortho phosphate (NaH$_2$PO$_4$), mono sodium hydrogen ortho phosphate alone or by using hydrochloric acid, as described in Table 2. The basic recipe used was 100 parts of vinyl chloride (in aqueous suspension), 210 parts of water, a paddle stirrer rotating at 300 r.p.m., a polymerisation temperature of 50°C, 0.09 parts of diethyl peroxydicarbonate as initiator and a suspension agent consisting of 0.2 parts of a partially hydrolysed polyvinyl acetate resin. The polymerisation of each batch was continued until the pressure in the autoclave had fallen by 40 p.s.i. below the steady pressure during polymerisation. The amount of build-up was estimated visually.

TABLE 2

| Example No | Amount additive (parts per hundred of vinyl chloride charged) and when added. | Amount of build-up produced | Final pH |
| --- | --- | --- | --- |
| 10 | None | None | 4.0 |
| 11 | 0.1 NaHCO$_3$ at beginning | None | 8.2 |
| 12 | 0.067 Na$_2$HPO$_4$ + 0.033 NaH$_2$PO$_4$ at beginning | None | 5.7 |
| 13 | 0.067 Na$_2$HPO$_4$ + 0.033 NaH$_2$PO$_4$ after 3 hrs reaction | None | 6.3 |
| 14 | 0.033 NaH$_2$PO$_4$ at beginning | None | 5.0 |
| 15 | 0.1 NaH$_2$PO$_4$ at beginning | Build-up on all surfaces | 3.2 |
| 16 | 0.037 HCl after 3 hrs reaction | Build-up on all surfaces | 2.6 |
| 17 | 0.033 HCl at beginning | Build-up on all surfaces | 3.0 |

The results of Table 2 show that build-up suppression may be achieved with the use of polyethylene imine provided the pH of the reaction medium is maintained above 4 for all or for a substantial part of the polymerisation reaction.

EXAMPLES 18 – 20

A series of vinyl chloride polymerisations was carried out in a stainless steel reactor to which polyethylene imine was added in the reactor charge. Polymerisation was carried out using 100 parts of vinyl chloride (in aqueous suspension), 150 parts of water, a paddle stirrer rotating at 225 r.p.m., a polymerisation temperature of 51°C, 0.06 parts of diethylperoxydicarbonate as initiator and a suspension agent consisting of 0.11 parts of a partially hydrolysed polyvinylacetate resin. Each polymerisation was buffered to an approximately neutral pH using a mixture of $Na_2HPO_4$ (0.066 parts) and $NaH_2PO_4$ (0.033 parts). The polymerisation of each batch was continued until the pressure in the reactor had fallen by 40 p.s.i. below the steady pressure during polymerisation. The amount of build-up formed was estimated by removing the adherent film and weighing. Results are given in Table 3.

TABLE 3

| Example No. | Amount of polyethylene imine added (parts per million of vinyl chloride charged) | Amount of build-up (parts per hundred vinyl chloride charged | Total reaction time (minutes) |
|---|---|---|---|
| 18 | None | 0.015 | 380 |
| 19 | 50 | None | 340 |
| 20 | 50 | None | 370 |

We claim:

1. A process for the production of vinyl chloride polymers which comprises polymerising under conditions of vigorous agitation vinyl chloride, or vinyl chloride and up to 20 percent by weight thereof of at least one ethylenically unsaturated monomer copolymerisable therewith, in aqueous dispersion, in the presence of a polymeric imine selected from the group consisting of polymeric ethylene imine and polymeric substituted ethylene imines wherein the substitution is essentially inert to the vinyl chloride polymerisation, the pH of the polymerisation medium being maintained at at least 4 for all or for a substantial period of the polymerisation.

2. A process according to claim 1 which is a batch polymerisation.

3. A process according to claim 1 in which the polymerisation is carried out in aqueous suspension.

4. A process according to claim 1 in which the polymeric imine used is polyethylene imine.

5. A process according to claim 1 in which at least part of the polymeric imine is incorporated into the polymerisation medium by applying a solution thereof onto the reactor wall before charging the aqueous medium and the ingredients for the polymerisation reaction to the reactor.

6. A process according to claim 1 in which at least part of the polymeric imine is incorporated into the polymerisation medium by charging it to the aqueous medium.

7. A process according to claim 6 in which the amount of polymeric imine added to the aqueous medium lies within the range 10 to 200 parts per million, based on the weight of the vinyl chloride used in the polymerisation.

8. A process according to claim 6 in which the amount of polymeric imine used lies within the range 20 to 80 parts per million.

9. A process according to claim 1 in which the pH of the polymerisation medium is maintained at at least 4 by the addition of an alkaline substance thereto.

10. A process according to claim 9 in which the alkaline substance is selected from the group consisting of the hydroxides, carbonates and bicarbonates of sodium, calcium and ammonium.

11. A process according to claim 1 in which the pH of the polymerisation medium is maintained at at least 4 by the use of a buffering mixture.

12. A process according to claim 11 in which the buffering mixture comprises disodium orthophosphate and monosodium hydrogen orthophosphate.

* * * * *